United States Patent [19]

Meader, Jr.

[11] Patent Number: 4,584,233

[45] Date of Patent: Apr. 22, 1986

[54] PATCH FOR URETHANE-BASED MEMBRANE AND METHOD

[75] Inventor: Arthur L. Meader, Jr., Berkeley, Calif.

[73] Assignee: Chevron Research Company, San Francisco, Calif.

[21] Appl. No.: 560,299

[22] Filed: Dec. 12, 1983

Related U.S. Application Data

[62] Division of Ser. No. 428,520, Sep. 30, 1983, abandoned.

[51] Int. Cl.$^4$ .................. B32B 27/12; B32B 27/18
[52] U.S. Cl. .................. 428/290; 156/307.7; 156/331.7; 427/140; 428/63; 428/291; 428/332; 428/423.1
[58] Field of Search .............. 428/63, 290, 291, 423.1, 428/33; 427/140; 524/59, 62, 425, 430, 491, 590, 848; 156/307.7, 331.7

[56] References Cited

U.S. PATENT DOCUMENTS

| | | | |
|---|---|---|---|
| 3,556,819 | 1/1971 | Koons | 524/59 |
| 3,683,303 | 8/1972 | Ayano et al. | 524/59 |
| 4,063,002 | 12/1977 | Wilson, Jr. | 524/59 |
| 4,065,924 | 1/1978 | Young | 428/63 |

*Primary Examiner*—Paul J. Thibodeau
*Attorney, Agent, or Firm*—S. R. LaPaglia; R. C. Gaffney; J. J. DeYoung

[57] ABSTRACT

A patch for the underwater patching of a urethane-based coating membrane is provided. The patch comprises a section of nonwoven, fabric-reinforced urethane-based membrane coated with a composition comprising a polyurethane; non-volatile extender; a volatile solvent; and a water-insoluble, heavier-than-water, inert filler material dense enough to make the composition denser than water. Methods for effecting the patching or repair using the patch are also provided.

9 Claims, No Drawings

_4,584,233_

PATCH FOR URETHANE-BASED MEMBRANE AND METHOD

This is a division of application Ser. No. 428,520, filed Sept. 30, 1983 is now abandoned.

BACKGROUND OF THE INVENTION

A urethane-based surfacing composition has been developed which finds particular use as a waterproof liner for water-retaining reservoirs. By lining the pond or reservoir with the membrane composition, contamination and water seepage problems are reduced or eliminated.

Even though the membrane coating is particularly tough and tear resistant, the membrane may occasionally suffer failures in the form of tears or holes punctured in it. These failures may be due to such circumstances as the attempted coating of the material over a sharp object at the time of installation, or the subsequent puncturing of the membrane by an external source such as a sharp stick or other foreign object. Larger fissures may also develop from the shifting or settling of earth beneath the lining membrane. One particular instance wherein the hole or tear may develop is when the membrane is used to line a farm pond and an animal, such as a cow or horse, drinking water from the pond accidently puts its hoof through the membrane The invention is directed towards a material and method for easily and effectively patching or repairing such holes or tears in the membrane, when it is used under water or in a circumstance where water would compromise the integrity of an ordinary patch, such as when the membrane is used for roofing material and a patch is needed to be applied in heavy rain.

Basically, the patch consists of a composition related to that of the membrane and compatible with it. Also included in the composition is a heavier-than-water, water-insoluble weighting material which, when included in the patching material, causes the patch to sink through the water and/or remain in place on the tear until firmly affixed and repaired. The repair material may also be applied directly under water, in which case it will adhere to the tear without floating away until the repair is complete.

SUMMARY OF THE INVENTION

A composition is provided for the repair of a urethane-based coating material. The composition is similar to the composition of the membrane itself; however, included in it is a water-insoluble, heavier-than-water filler material which permits the repair of the membrane under water or in conditions where it may be removed or compromised by water. Also provided is a method for effecting the repairs in the membrane, using the disclosed composition.

The urethane-based surfacing composition is similar to that disclosed in U.S. Pat. No. 3,900,687. It ordinarily comprises (1) an adhesion promoter, (2) a sealing coat, and (3) a membrane coat, the seal coat and membrane coat being closely related, although applied in different stages. The membrane/seal coat ordinarily comprises a polyurethane formed by reacting a mixture of high molecular weight polyol and a low molecular weight chain stiffener with a polyisocyanate; a substantially inert, nonvolatile extender; and a volatile solvent.

The composition for patching the membrane consists essentially of (1) a premix of the membrane coat comprising the high molecular weight polyol, the low molecular weight chain stiffener, the inert, nonvolatile extender and the volatile solvent mixed with a water-insoluble, heavier-than-water filler such as hydrated alumina. This premix/heavy filler mixture is ordinarily activated just prior to use by mixing with the polyisocyanate, causing the polyurethane to be formed and set up.

A method for applying the repair material is also provided which includes mixing of the specified premix/heavy filler precursor with the polyisocyanate activator and applying to the repair area under water either by spreading, spraying or sinking a desired amount to the area to be repaired from the surface of the water. The repair mixture is then allowed to cure in contact with the surrounding membrane, permitting the water-tight adhesion of the patch to the membrane.

An alternative method of patching is provided whereby the premix/heavy filler precursor is activated with polyisocyanate and applied to preformed sections of fabric-reinforced membrane. The patching composition essentially acts as a heavier-than-water glue, causing the fabric-reinforced membrane patch to adhere to the damaged membrane, sealing off the tear.

DETAILED DESCRIPTION OF THE INVENTION

A polyurethane-based membrane patching material is provided that comprises: (a) a polyurethane formed by reacting a mixture of high molecular weight polyol and a low molecular weight chain stiffener with a polyisocyanate; (b) a substantially inert, nonvolatile extender; (c) a volatile solvent; and (d) a heavier-than-water, water-insoluble filler. The weight percents of the various components of the composition include 25 to 75, preferably 30 to 50, parts by weight of (1) a polyurethane formed by reacting 20 to 55, preferably 35 to 50, parts by weight of a (a) a polyurethane precursor with 6 to 20, preferably 5 to 10, parts by weight of (b) a polyisocyanate; 25 to 75, preferably 35 to 50, parts by weight of (2) a substantially inert, nonvolatile extender; 0 to 20, preferably 0 to 10, parts of (3) a volatile solvent; and 10 to 50, preferably 20 to 30, parts by weight of a water-insoluble, heavier-than-water filler material. The polyurethane precursor of the composition comprises a mixture of 15 to 60, preferably 30 to 55, parts by weight of a high molecular weight polyol and 2 to 20, preferably 4 to 8, parts by weight of a low molecular weight chain stiffener.

The repair material should have properties similar to that of the membrane itself, including good tensile strength after cure, good elongation properties and high tear strength. Furthermore, these properties must be exhibited over temperatures ranging from −20° F. to 140° F., the temperature reached by highway surfaces in the summer sun. Additionally, the composition of the patch must be such that it bonds well with the original membrane coat, particularly under water or other wet circumstances.

The Polyurethane

The polyurethane of the repair material is prepared by reacting a polyisocyanate with a polyurethane precursor. The precursor is a blend of high molecular weight polyol and low molecular weight chain stiffener.

The high molecular weight polyols are primarily diols although there may be minor amounts of higher order polyols present. Preferably, the polyols will have a molecular weight ranging from 2,000 to 4,000. At least two of the hydroxyl groups will usually be at or near the terminal carbon atoms and will be separated by hydrocarbon chains of at least 40 carbon atoms. Preferably, the diols are primary alcohols. The polyols may also be derived from such monomers as butadiene, styrene, isoprene, etc.

The low molecular weight chain stiffener is incorporated to increase the tensile strength and the tear strength of the composition. The chain stiffeners include polyols, polyamines and hydroxyamines. They generally have from about 2 to about 12 atoms separating the more distant hydroxyl and/or amine groups and normally contain from 4 to 18 carbon atoms. Examples of suitable chain stiffeners include: 3-dimethyl-amino-1,2-propane diol; diethanolamine; 1,4-butanediol; tolidine; diethylene glycol; and N,N-bis-(2-hydroxypropyl) aniline. The mole ratio of the isocyanate reactive groups of the low molecular weight chain stiffener to the isocyanate reactive groups with high molecular weight polyol will range from 0 to 3:1, and will preferably be about 1.5 to 2.5:1.

The polyisocyanates will generally be diisocyanates or mixtures of diisocyanates with higher orders of polyisocyanates normally not exceeding five isocyanate groups. Preferably, diisocyanates will be used, generally having from about 6 to 24 carbon atoms. Illustrative polyisocyanates include bis(isocyanatophenyl)methane, diphenyldiisocyanate, toluene diisocyanate (TDI), polyphenylpolymethylene isocyanate (PAPI), and poly(methylenephenylenepolyisocyanate). The first polyisocyanate is preferred. The ratio of isocyanate groups to isocyanate reactive groups used to form the polyurethane in the repair mixture is normally in the range of 0.8 to 1.4:1, preferably 1.05 to 1.15:1. A catalyst is also required in sufficient quantity to effect the desired curing of the polyurethane. The usage level will generally range from about 0.005 to about 0.2 weight percent of the total composition. Suitable catalysts include dibutyl tin dilaurate, diazabicyclooctane, and stannous octoate. The dibutyl tin dilaurate is preferred.

The Extender

A variety of cutback asphalts are suitable. Cutback asphalts are mixtures of asphalt and a volatile solvent. Suitable asphalts include those having penetrations from about 40 to about 200, preferably 50 to 150, at 77° F. The solvents used in preparing cutback asphalts are generally volatile; that is, they usually have boiling points such that they evaporate from the asphalt within a short period after the asphalt cutback is spread out to form the surface. The polyurethane precursors can also be mixed with an extender oil instead of or in addition to the cutback asphalt. The oil should not bleed or exude from the repair material ultimately prepared from the components.

The Volatile Solvent

The repair material also contains a volatile solvent to lower the viscosity of the uncured mixture sufficiently to improve its handling characteristics and spreadability or sprayability. Most of the solvent evaporates from the repair material during and after curing. Suitable solvents include aromatic, low-boiling petroleum hydrocarbons including toluene and xylene and/or aliphatic, low-boiling hydrocarbons such as hexane, heptane, cyclohexane, mineral spirits, naphtha and the like.

The Heavy Filler

A number of filler materials may be used as long as they are insoluble in water and will render the patching material heavier than water, thus facilitating its ability to be used under water without shifting or failure. Many inorganic and/or organic fillers may be used as long as they meet these characteristics. Additionally, they must be nonreactive with the other membrane materials and not interfere with the curing process. Ideally, they should also be inexpensive, readily available, and easily handled. Materials suitable for this purpose may include hydrated alumina, ground limestone or calcium carbonate, ground silica or sand, or any finely-ground, uniform, inert material.

Composition Preparation

The components of the composition excluding the heavy filler and the polyisocyanate are generally referred to as the "premix". This refers to the convenience in mixing and/or storing them ahead of the time when they will be used. The premix comprises the extender, the high molecular weight polyol, the low molecular weight chain stiffener, and the catalyst. It may be brought to the work site either alone or premixed with the heavy filler.

The patching composition is prepared at the job site or in close proximity to the repair to be made. A mix of preferably 75 to 25 parts by weight of the premix:heavy filler is prepared and mixed with the desired or usual amount of polyisocyanate activator. This can be done in any convenient manner using an amount sufficient to properly coat the repair area to be made. The mixing may be done by hand or, if the repair is particularly large, it may be done in a cement or plaster mixer.

The patch material can be applied in a variety of ways. The most convenient way is to spread the material by hand to the desired thickness over the area to be repaired. A squeegee may also be used to facilitate application. These methods would necessitate the repairman submerging himself in the water to a depth sufficient to effect the repair.

Alternatively, the composition may be spread on a preformed section of fabric-reinforced membrane cut in a shape and size appropriate to effect the repair. The patch may be then placed composition side down over the repair area, the composition on the patch adhering to the membrane. Initially, the area to be patched or repaired needs to be cleaned of all contaminants such as mud, silt, and algae which may interfere with an effective patching process.

Yet another alternative for patching which is particularly effective in situations where the water level is such that it is too deep to apply by hand or the water level cannot be lowered, is to prepare a patch section using the patching composition and amount of heavy filler sufficient to permit the patch to sink under its own weight to the repair area. The patch then adheres to the repair site sufficiently to permit the patch to set up and seal. The patch is positioned on the water surface above the repair area and may be guided down to the surface area by the operator as it sinks.

In yet another alternative, the patching material may be sprayed on the repair area using conventional spraying equipment. This may be particularly effective in a situation where the area to be repaired is not submerged, but is wet or subject to a wetting such as a roof while it is raining.

The following example further illustrates the invention but is not meant to be limited hereto.

EXAMPLE

A T-shaped cut was made in a sample of polyurethane-based membrane reinforced with 2 ounces/yard$^2$ of nonwoven nylon fabric or 3 ounces/yard$^2$ propylene nonwoven fabric. A mixture 75 to 25 parts by weight of premix patching material:hydrated alumina was prepared and activated with an appropriate amount of polyisocyanate activator. The patch material was applied to the cuts in the above fabrics under water and spread to a thickness of approximately ⅛ inch. The patch was left to cure under water for approximately 24 hours. The mixture foamed slightly due to the reaction of some of the isocyanate with water, but the patch adhered strongly and remained water-tight. (It is possible that the foaming may be reduced by waiting a short period after mixing before applying the patching material to permit the isocyanate to react with the premix.)

It was also found that the patching material adhered strongly to wood and steel when applied under water and may be appropriate for use in instances where a patch is required on those materials. Larger holes may be repaired by applying the patching mixture to nonwoven, organic fabrics such as polyester, polypropylene or nylon of sufficient area to cover the repair area as detailed above.

The specific embodiments of the invention having been described in detail, it should be understood that the invention is to be given broadest possible interpretation within the terms of the following claims.

What is claimed is:

1. A patch for patching a urethane-based coating membrane comprising a section of nonwoven, fabric-reinforced, urethane-based membrane, said membrane section being coated with sufficient patching composition to permit said patch to adhere in a water-tight manner to said urethane-based coating membrane, said patching composition comprising:
   (a) 25 to 75 parts by weight of polyurethane formed by reacting 20 to 55 parts by weight of a polyurethane precursor with 6 to 20 parts by weight of a polyisocyanate;
   (b) 25 to 75 parts by weight of a substantially inert, nonvolatile extender selected from the group of cutback asphalts and extender oils;
   (c) a volatile solvent; and
   (d) 20 to 50 parts by weight of a water-insoluble, heavier-than-water filler material sufficiently dense to make the composition denser than the density of water.

2. The patch as claimed in claim 1, wherein the patching composition comprises 30 to 50 parts by weight of said polyurethane formed by reacting 35 to 50 parts by weight of said polyurethane precursor with 5 to 10 parts by weight of said polyisocyanate; 35 to 50 parts by weight of said non-volatile extender; up to 20 parts by weight of said volatile solvent; and 20 to 30 parts by weight of said heavier-than-water filler.

3. The patch as claimed in claim 1, wherein said heavier-than-water filler is an inert, inorganic, finely-ground material.

4. The patch as claimed in claim 3, in which said heavier-than-water filler is selected from hydrated alumina, ground limestone, ground silica, and calcium carbonate.

5. The patch as claimed in claim 2, wherein said polyisocyanate is reacted with said polyurethane precursor in a mole ratio of 1.0 to 1.4:1, said polyurethane precursor comprising 30 to 55 parts by weight of a high molecular weight polyol and 4 to 8 parts by weight of a low molecular weight chain stiffener.

6. A patch as claimed in claim 1, in which said composition is coated on said fabric-reinforced membrane section in a thickness of from one-sixteenth to one-half inch.

7. A method for repairing a urethane-based coating membrane comprising applying a patch as claimed in claim 1 or 2 of sufficient area to cover the hole or tear in said membrane, over said hole or tear and permitting said patching composition to set and provide a secure, water-tight seal.

8. The repair method as claimed in claim 7, in which said repair is carried out under water.

9. A method for repairing a water-submerged, urethane-based membrane comprising forming a patch as claimed in claim 1 or 2 of sufficient area to effect said repair; positioning said patch on the surface of the water above the area to be repaired; permitting said patch to sink to said membrane coating while guiding it to the desired position; and allowing the patching composition to set and provide a secure, water-tight seal.

* * * * *